March 18, 1930.  C. E. BRADLEY  1,750,619

DENTURE

Filed Aug. 23, 1927

Inventor:
Charles E. Bradley.
By Eugene M. Giles
Atty.

Patented Mar. 18, 1930

1,750,619

UNITED STATES PATENT OFFICE

CHARLES E. BRADLEY, OF MISHAWAKA, INDIANA

DENTURE

Application filed August 23, 1927. Serial No. 214,846.

My invention relates to dentures, either full or partial, wherein artificial teeth are mounted on a plate or structure of vulcanized rubber or the like for supporting the teeth in the mouth, and has reference more particularly to the construction of the denture with a cushion surface.

In dentures as constructed heretofore, the plate or supporting structure for the artificial teeth consisted of vulcanite or a relatively hard rubber composition having a firm unyielding surface in contact with the gums and membranes of the mouth, and this oftentimes causes great discomfort and permanent injury when fitted on sensitive gums. With my invention however, a cushion surface is provided on the contact side of the plate or on the portions thereof which engage the gums and membranes or other parts in the mouth for positioning and maintaining the denture in place, and this insures greater comfort and avoids injury to the gums. Moreover in a denture of this character it is highly important not only to insure a thorough and permanent bonding of the cushioning material to the hard portions of the denture and to utilize a cushioning material, the yielding or relatively soft character of which will not be impaired by the conditions to which it is subjected in the mouth, but furthermore the cushioning material must be entirely devoid of any toxic or irritating effect or any unpleasant or disagreeable taste, and all of this is accomplished by my present invention.

The principal objects of my invention are to avoid discomfort and possible injury occasioned by present dentures; to cushion the contact surface of the denture; to utilize a thin facing of relatively soft rubber composition for this purpose; to insure a thorough bonding of the soft and hard portions of the plate or denture; to insure permanency of the cushion surface; to utilize a composition which has no toxic or irritating effect or unpleasant taste and which is not affected by moisture conditions in the mouth; to minimize the weight of the denture; to afford greater adhesion of the plate or denture in the mouth; and in general to provide an improved denture which may be readily made and having advantages of comfort and strength not found in previous dentures.

Figure 1:
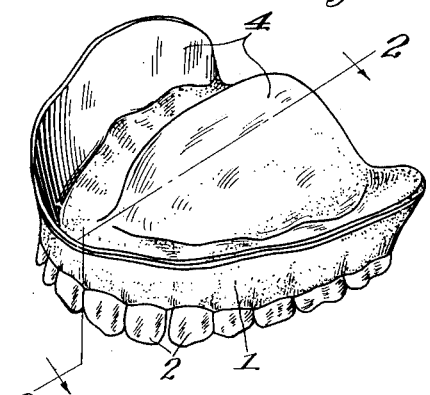
Fig. 1 is a perspective view of a full upper denture embodying my improvements.

Referring to the drawing, the reference numeral 1 indicates the plate or supporting structure of the denture which consists of thin hard rubber or suitable plastic shaped to fit the particular gums and palate or other parts of the mouth in which it is to be used. Around the margin of the plate 1 the hard rubber is thickened and shaped to mount the teeth 2, which have their upper ends embedded in the rubber in the usual manner and are preferably provided with pins 3 or other suitable means to anchor the teeth securely in the rubber. For protecting the gums and membranes of the mouth from direct contact with the hard surface of the rubber structure 1, I have provided a thin facing 4 of relatively soft rubber on the contact side of the denture, said rubber facing 4 being of a degree of softness approximating that of the gums and membranes of the mouth with which it comes in contact, so as to afford a comfortable fit and avoid any hard and rigid parts coming in direct contact with the gums and membranes.

The rubber facing 4 is thoroughly bonded to the hard rubber 1 as by vulcanizing in a suitable manner to combine the two parts into a unitary mass, and said facing, because of its relatively soft character, in addition to its cushioning function, acts as a sealing member to improve the adhering properties of the denture and also protects the hard rubber against breakage. Another advantage of the soft cured coating is the reduction in weight obtained through its use as it is necessarily not compounded as heavily as hard curing rubber stock.

In making my improved denture, substantially the usual practice is followed of taking plaster impressions of the gums, from which casts of the upper and lower gums are made, taking a bite in wax for properly locating the casts in a natural relative position on a mechanical articulator,—the building up of a preliminary or try-in structure in the form of the finished plate by setting the selected artificial teeth in wax and shaping the latter on the mechanical articulator and trying them for proper fit in the patient's mouth,—then making a mold from the preliminary structure or pattern and melting out the wax and thereafter packing the space in the mold formerly occupied by the wax, with rubber composition and then vulcanizing and finishing the plate.

Figure 3:
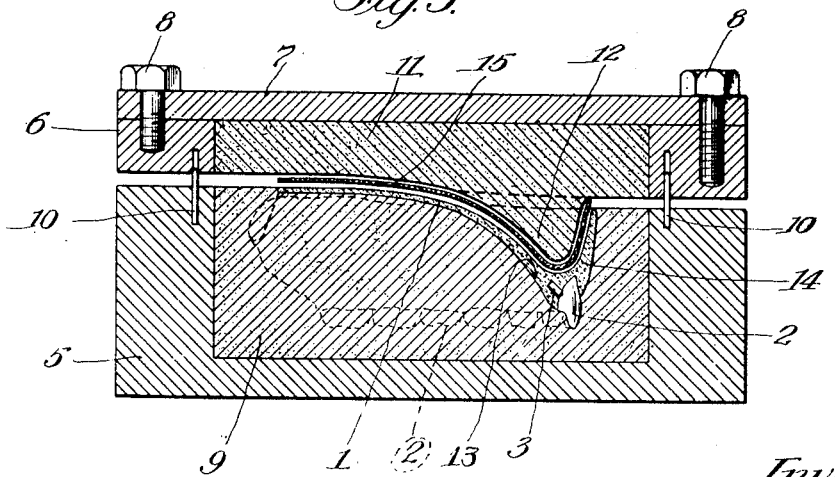
Fig. 3 is a sectional view of the vulcanizing flask and mold just before closing together for vulcanization.

The mold employed, and which is indicated in a general way in Fig. 3, is made in the usual manner by using a flask consisting of the bottom section 5, the rim section 6 and the cover 7, which latter may be secured to the rim section 6 by cap screws 8. The wax pattern or try-in structure with the teeth is inserted in the lower half 5 of the flask and plaster 9 flowed in the latter to the upper edges of the wax so that the lower, front and side surfaces of the wax pattern and the teeth are covered and embedded in the plaster. The plaster is then allowed to harden, after which a separating fluid is poured over the new plaster in the flask in order that the halves of the finished mold will separate easily. The other half or rim section 6 of the flask is then applied over the bottom half 5, dowel pins 10 being utilized to establish proper registration, and then plaster 11 is flowed into the upper section 6, covering and filling in the top of the wax form, after which the cover 7 is fastened down in place on the section 6 by the cap screws and the plaster 11 allowed to harden. This accomplished, the flask is placed in very hot water and allowed to remain until the wax holding the teeth is very soft, whereupon the flask is split in half by removing the section 6—7 from the section 5 and boiling water is used to wash away all wax. In the the half or section 5 of the flask the teeth remain embedded in the plaster 9, while the other half 6—7 retains the form 12 of the jaw, and when the sections 9 and 11 thereof are clamped together again, a cavity 13 is present therein, conforming exactly in shape and size to the wax pattern.

Properly compounded rubber or other suitable plastic in sheet form is then packed in the cavity 13 of the mold, gates being cut in the plaster of Paris in the flask to allow excess rubber to flow out. The flask is then closed and placed in hot water for a time and then introduced in a press and forced together, the halves being bolted or otherwise secured together at this time, and the closed flask is then placed in a vulcanizer and exposed for the required length of time to vulcanizing temperature. When vulcanization is completed, the flask is allowed to cool and the finished plate is taken out, cleaned and polished.

Figure 2:
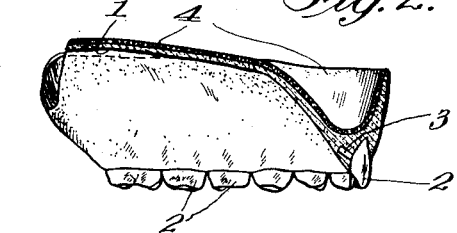
Fig. 2 is a longitudinal sectional view thereof, on the line 2—2 of Fig. 1.

In making my denture substantially the same procedure as outlined above is followed except that the cavity 13 is not packed with sufficient hard rubber composition 14 to entirely fill the cavity, but it is arranged so that when the hard rubber composition 14 has been packed in, there is enough remaining space for a thin sheet or layer 15 of suitable rubber composition which is laid over the hard rubber composition 14 and upon vulcanization this layer 15 forms a cushion 4 (see Figs. 1 and 2) of relatively soft rubber having about the same degree of softness as the gums and membranes of the mouth.

Any suitable compound such for example, as used at present in ordinary dentures, may be employed for the portion 1 of my improved plate. The soft portion or cushion facing 4 (indicated at 15 in Fig. 3) however consists of a special composition which when vulcanized affords a reltively soft cushion facing which is thoroughly bonded to the hard portion 1 of the denture, retains its cushioning character under the moisture conditions of the mouth and has no unpleasant taste or effect. Such a composition may be prepared as follows, the proportions indicated being determined by weight:

| | |
|---|---|
| Rubber | 100 |
| Zinc oxide | 10 |
| Vermilion | 20 |
| Trimene base | 1 |
| Sulphur | 2 to 5 |

The use of a small amount of sulphur in a rubber compound produces a soft rubber when vulcanized, but this alone is not sufficient in combining a thin soft layer with hard rubber in a structure of this character. The sulphur migrates from the heavily compounded rubber and the soft layer not only becomes too hard, but it is impossible to maintain a definite line of division between the hard and soft layers and to control the thickness of the soft portion. By using an accelerator, however, the soft layer is vulcanized quickly before migration of sulphur takes place, and as migration of sulphur does not occur after the soft layer is vulcanized, the softness of the rubber can be controlled and a definite line of division maintained between the hard and soft portions, and the desired thickness of the latter obtained. A non-toxic accelerator is necessary in an article of this character, and I prefer to use the Trimene base, which is a commercial product made by the reaction of ethylamine on formaldehyde and sold under the name Trimene base.

With a cushioning material compounded as above, the vulcanization of the cushion facing and bonding of the hard and soft portions takes place without transfusion of sulphur from the hard rubber compound, which necessarily contains a relatively large proportion of sulphur, and a cushion facing results which retains its relatively soft cushioning characteristic for a long period of time, is unimpaired by moisture conditions in the mouth and otherwise affords a satisfactory cushion facing for use on a denture of any form or character. This soft rubber facing, in addition to affording comfort and avoiding possible injury to the gums and membranes of the mouth, also has a strengthening effect, serves to avoid breaking of the hard rubber portions and gives to the plate a greater adhering property for maintaining its position in the mouth.

While I have shown and described my invention in a preferred form, I am aware that various changes and modifications may be made without departing from the principles of my invention, the scope of which is to be determined by the appended claims.

I claim as my invention:

1. A vulcanite denture comprising a hard rubber mounting with artificial teeth thereon and having a layer of soft rubber containing an organic accelerator and from two to five parts combined sulphur vulcanized on the palatine side thereof.

2. In a denture, the combination of a structure having a plurality of teeth mounted thereon and said structure comprising distinct layers of rubber vulcanized in an integral mass and one of said layers being composed of a composition containing an organic accelerator and less than five parts by weight of sulphur.

3. In a denture, the combination of a structure having a plurality of teeth mounted thereon and said structure comprising distinct layers of hard and soft rubber compositions, the soft layer being composed of rubber, a zinc derivative, coloring matter, an organic accelerator and a minimum amount of sulphur.

4. In a denture, the combination of a structure having a plurality of teeth mounted thereon and said structure comprising distinct layers of hard and soft rubber compositions and the soft layer being composed of rubber, a zinc derivative, coloring matter, a non-toxic accelerator and sulphur.

5. In a denture, the combination of a structure having a plurality of teeth mounted thereon and said structure comprising hard and soft portions of rubber compositions and the soft portion being composed of rubber, zinc oxide, coloring matter, a non-toxic accelerator and sulphur in substantially the proportions by weight as specified.

6. A vulcanite denture comprising a hard rubber mounting for artificial teeth and a layer of soft rubber vulcanized thereon in the initial stage of vulcanization of the hard rubber.

7. In a denture, the combination of a structure having teeth mounted thereon and said structure comprising distinct layers of hard and soft rubber compounds, the soft layer being composed of rubber with an accelerator and a minimum amount of sulphur.

CHARLES E. BRADLEY.